(12) United States Patent
Bionta et al.

(10) Patent No.: US 12,372,676 B2
(45) Date of Patent: Jul. 29, 2025

(54) NEUTRON ACTIVATION DETECTOR

(71) Applicant: Lawrence Livermore National Security, LLC, Livermore, CA (US)

(72) Inventors: Richard M. Bionta, Livermore, CA (US); Eugene Albert Henry, Livermore, CA (US)

(73) Assignee: LAWRENCE LIVERMORE NATIONAL SECURITY, LLC., Livermore, CA (US)

( * ) Notice: Subject to any disclaimer, the term of this patent is extended or adjusted under 35 U.S.C. 154(b) by 114 days.

(21) Appl. No.: 18/335,113

(22) Filed: Jun. 14, 2023

(65) Prior Publication Data

US 2024/0418880 A1  Dec. 19, 2024

(51) Int. Cl.
*G01T 3/02*  (2006.01)
*G01T 3/00*  (2006.01)

(52) U.S. Cl.
CPC ............... *G01T 3/008* (2013.01); *G01T 3/02* (2013.01)

(58) Field of Classification Search
CPC .................... G01T 3/02; G01T 3/008
See application file for complete search history.

(56) References Cited

U.S. PATENT DOCUMENTS

| | | | |
|---|---|---|---|
| 2020/0041685 A1 | 2/2020 | Podpaly et al. | |
| 2021/0189587 A1* | 6/2021 | Wang | ............ C30B 15/02 |
| 2021/0189588 A1* | 6/2021 | Wang | ............ G01T 3/06 |

FOREIGN PATENT DOCUMENTS

| | | | | |
|---|---|---|---|---|
| EP | 2418675 B1 | 9/2020 | | |
| KR | 20070102687 A | 10/2007 | | |
| KR | 20130035370 A | 4/2013 | | |
| KR | 20180137579 A | 12/2018 | | |
| WO | WO-2018219406 A1 * | 12/2018 | ........... | G01N 23/222 |
| WO | WO-2020185366 A2 * | 9/2020 | ........... | G01N 23/222 |

OTHER PUBLICATIONS

International Search Report and Written Opinion Received in Application No. PCT/US24/34008, dated Sep. 11, 2024, 10 pages.
R. M. Bionta et. al., "Real-time nuclear activation detectors for measuring neutron angular distributions at the National Ignition Facility (invited)," Review of Scientific Instruments (vol. 92, Issue 4) 2021.

* cited by examiner

*Primary Examiner* — Mark R Gaworecki
(74) *Attorney, Agent, or Firm* — Perkins Coie LLP

(57) ABSTRACT

A neutron activation detector comprises a first enclosure, a plurality of electrical leads, and an activation medium disposed within the enclosure. The activation medium consists substantially of a material that is activated by fast neutrons, and is arranged within the enclosure so that activation of the material by fast neutrons results in a current between the plurality of electrical leads.

27 Claims, 18 Drawing Sheets

300

Produce, by a material within the fast neutron detector, gamma particles in response to impacts on the material by fast neutrons
301

Cause electron avalanche within the fast neutron detector in response to the gamma particles, wherein the electron avalanche induces fluctuations in a voltage between a plurality of electrodes
302

Detect individual fluctuations in the voltage
303

Determine a count of the detected fluctuations in the voltage
304

Produce an output indicative of the count
305

FIG. 3

NEUTRON ACTIVATION DETECTOR

STATEMENT REGARDING FEDERALLY SPONSORED RESEARCH

The techniques introduced here was made with Government support under Contract No. DE-AC52-07NA27344 awarded by the United States Department of Energy. The Government has certain rights in the invention.

FIELD

The techniques introduced here generally pertain to techniques for neutron activation detection, and more particularly, to a technique for fast neutron activation detection with reduced interference from background radiation.

BACKGROUND

In certain scientific disciplines it is useful to measure fast neutron activity in a particular environment. A "fast neutron" is defined herein as a neutron with energy in excess of 1 MeV. For example, the ability to measure the angular distribution of emitted 14 MeV neutrons is an important tool for determining the shape and integrity of the compressed deuterium-tritium (DT) fuel assembly in inertial confinement fusion (ICF) implosions. The current state-of-the art for making these measurements uses compact $LaBr_3(Ce)$ crystal spectrometers to monitor the activation of zirconium (Zr) cups distributed around the target chamber. While the crystal spectrometers allow the signal from the activated Zr to be separated from the backgrounds, at high flux the background overwhelms the detector electronics, and the separation cannot be done until the background sufficiently decays, which can take weeks after a high yield shot.

BRIEF DESCRIPTION OF THE DRAWINGS

One or more embodiments of the techniques introduced here are illustrated by way of example and not limitation in the figures of the accompanying drawings, in which like references indicate similar elements.

FIG. 3 is a flow diagram illustrating an example of a process of the operation of the NAD.

DETAILED DESCRIPTION

Figure 1A:
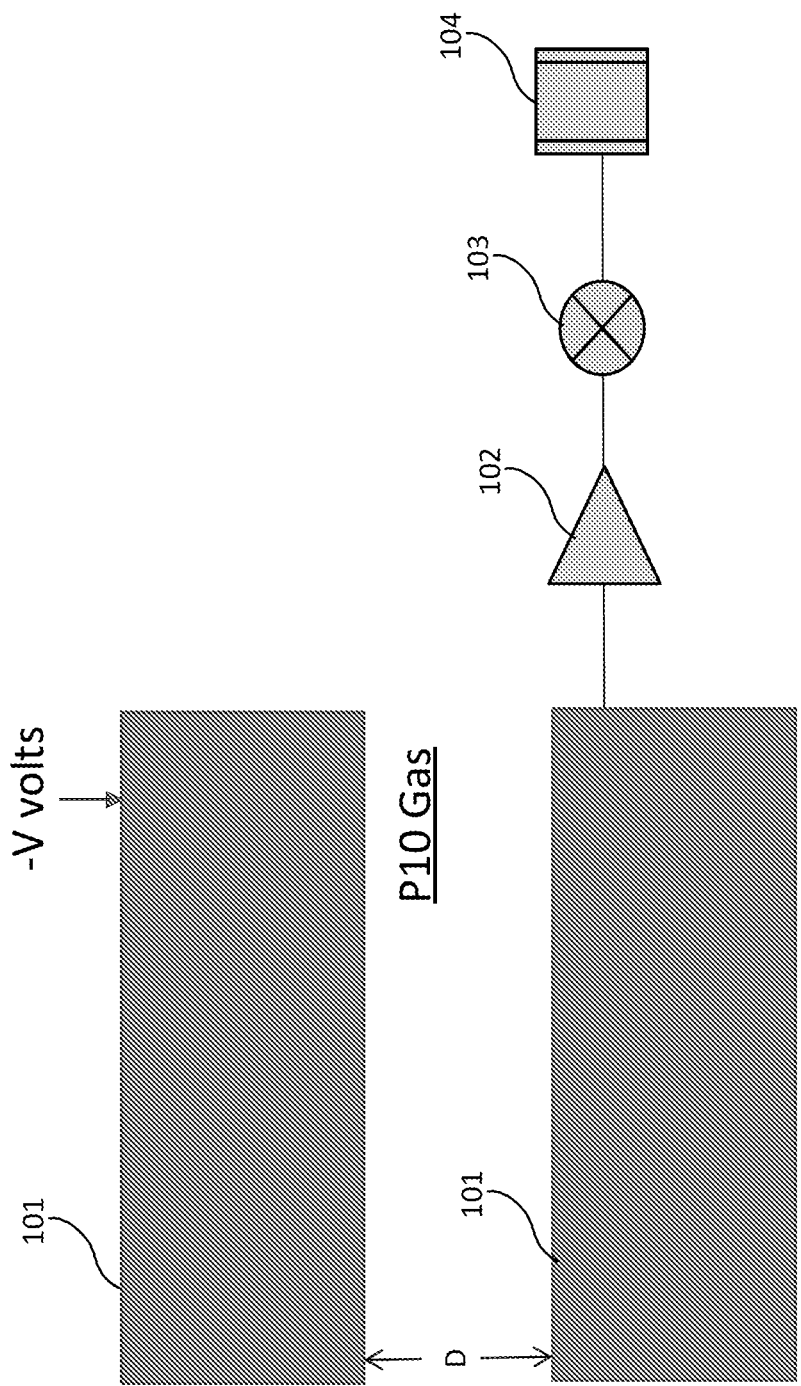
FIG. 1A shows conceptually an activation medium and associated electronics for a neutron activation detector (NAD).

In this description, references to "an embodiment", "one embodiment" or the like, mean that the particular feature, function, structure or characteristic being described is included in at least one embodiment of the techniques introduced here. Occurrences of such phrases in this specification do not necessarily all refer to the same embodiment. On the other hand, the embodiments referred to also are not necessarily mutually exclusive.

The inventors of the present application have discovered that in conventional neutron activation detection, much of the background comes from the detector itself. Specifically, the La, Br, Ce, Mn, and Al components of the crystal, photo-tube and shield all become activated under irradiation by neutrons of various energies, which interferes with accurate measurement. It is possible to use $LaCl_3$ crystals, which would eliminate the Br and possibly reduce the background by a factor of two to five. However, the backgrounds from the other materials in the detector and from outside the detector will still be present.

The technique introduced here includes measurement of neutron flux in a high radiation environment by use of a gaseous ionization detector whose anodes, cathodes, and structure contain materials that become activated by the neutrons of a desired energy, as set by the neutron energy threshold of the nuclear reaction that activates the material. The ionization detector can be of any type where secondary radiation from the decay of the activated material traverses a gas-filled cavity resulting in a detectable electrical signal such as ion chambers, proportional counters (both cylindrical and planer), and Geiger-Muller tubes.

A gaseous ionization detector generally has a low cross-section for external radiation, reducing background in high radiation environments. Thus, the electrical signals produced by a gaseous ionization detector whose anodes, cathodes, and structure contain materials that become activated by the neutrons will be dominated by the signals from the secondary radiation produced by the decay of the neutron activated material. The number of neutrons striking the detector can be inferred from the strength of the electrical signal.

Introduced here, therefore, is a neutron activation detector (NAD) (also called "the detector") that is not a source of background itself. Notably, in the NAD introduced here, the activation material is part of the detector itself, in contrast with conventional NADs. In at least some embodiments, the NAD introduced here comprises a first enclosure, a plurality of electrical leads, and an activation medium disposed within the enclosure. The activation medium consists substantially of a material that is activated by fast neutrons, and in at least some embodiments is arranged within the enclosure so that activation of the material by fast neutrons results in a current between the plurality of electrical leads.

The NAD introduced here, in at least some embodiments, is for measuring 14 MeV neutrons from fusing plasma produced in ICF implosions, prolonged DT burns such as in tokomaks, or other DT neutron generators. The NAD introduced here in at least some embodiments includes a stack of wafers of Zr or other material that is activated by 14 MeV neutrons, encased by a simple framework of thin, non-activating, electrically insulating material such as an acrylic glass (e.g., Lucite). The stacked wafers are used to form the anode and cathode of a gaseous ionization device. The Zr or other wafer material is activated in response to the 14 MeV neutrons, causing emission of secondary radiation, such as gamma rays ("gammas"), electrons (both positively and negatively charged), or in some cases alpha particles. "Secondary radiation" in this context refers to any radiation produced as a consequence of activation by fast neutrons. The emitted secondary radiation causes an electron avalanche or other form of electronic discharge in a gas disposed between the wafers, which causes a pulse of current to flow between the anode and cathode. At low neutron fluxes the current pulses can be counted to measure the neutron-induced activity. At higher rates the pulses blend into a continuous current that can be measured directly, as in a smoke detector, and the time history of the continuous current provides information on the time history of the neutron flux.

The NAD introduced here includes nothing besides the Zr (or other activation material that may be substituted for Zr) that gets activated by fast neutrons, and the low mass of the NAD makes it inefficient to detect external gammas. Thus, the major sources of backgrounds that adversely affect conventional NADs are eliminated or greatly reduced with the NAD introduced here. Furthermore, the gaseous ionization detection allows much higher counting rates, which when used with anode and cathode materials with short activation half-lives (minutes to hundreds of minutes), allows data to be accumulated and analyzed more quickly. With even shorter half-lives (e.g., less than one second) the NAD introduced here could be used to monitor fluctuations in yield during a several-minute tokomak burn, such as in magnetic confinement fusion (MCF). Hence, the specificity of the neutron interaction in the wafers, the small mass of the detector, and the absence of any material subject to low-energy neutron interactions make the detector nearly free from backgrounds that adversely affect conventional NADs in high rate, high background environments.

Figure 1B:
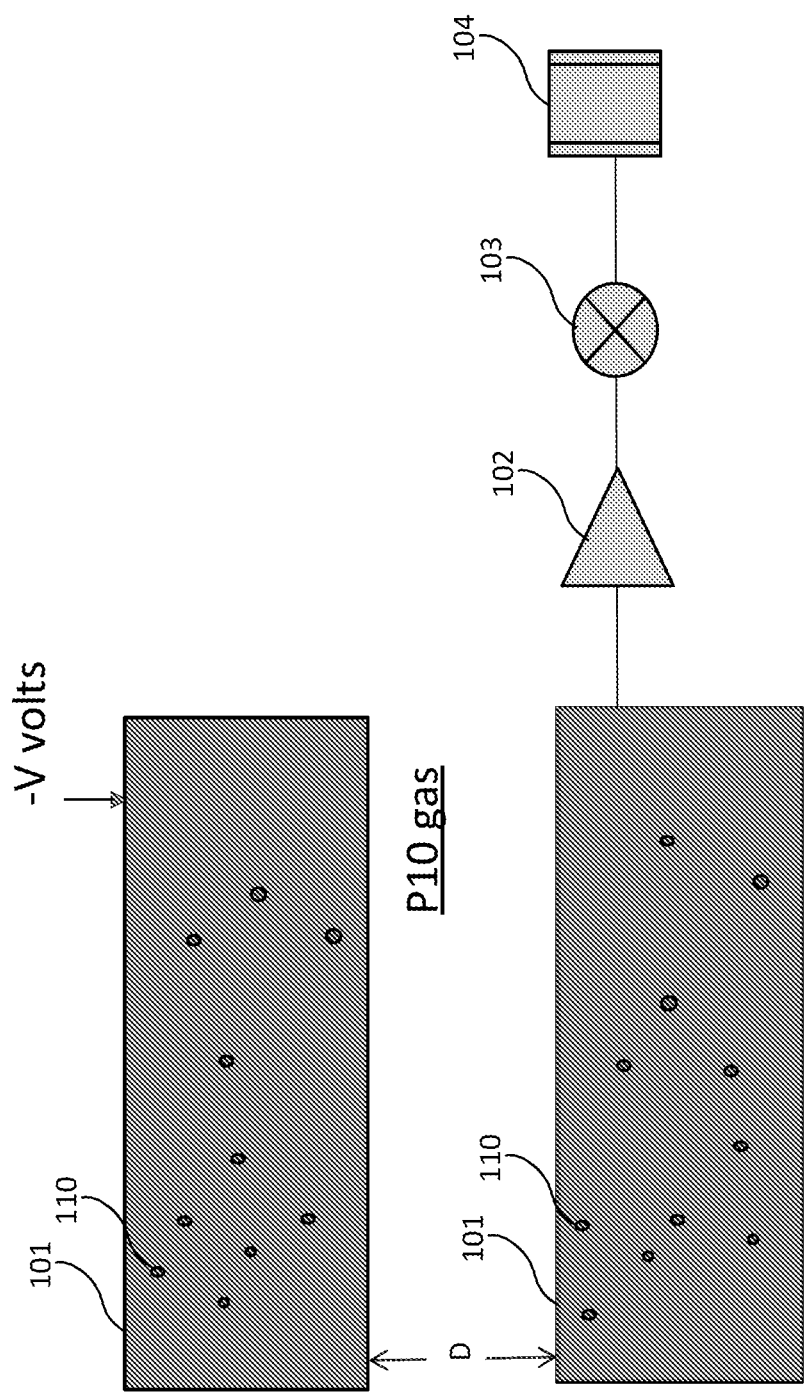
FIG. 1B shows the NAD of FIG. 1A, in which some of the material of the wafers has formed an isotope in response to fast neutron bombardment.
Figure 1C:
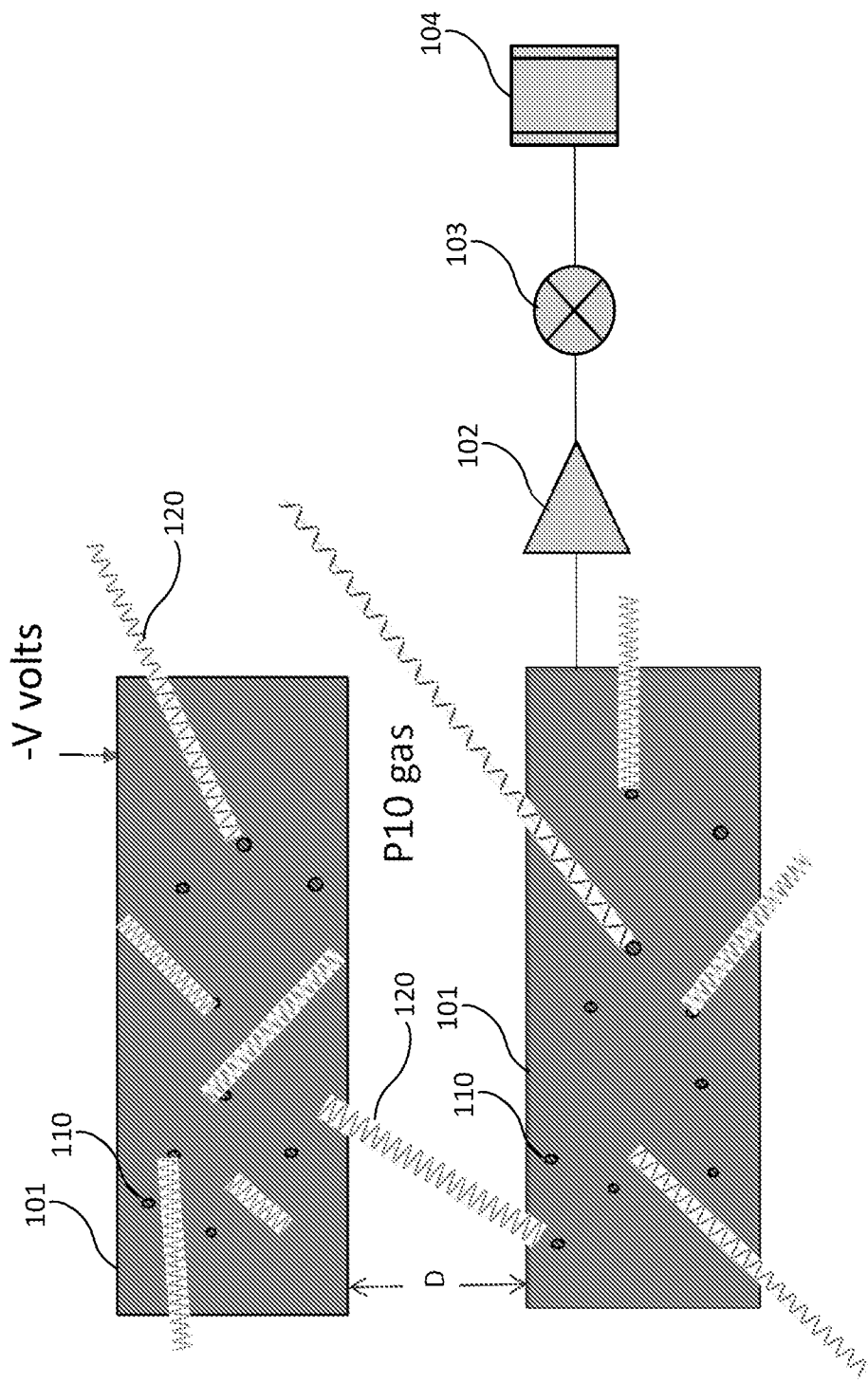
FIG. 1C shows the NAD of FIG. 1B, in which some of the isotope is decaying to emit gammas.
Figure 1D:
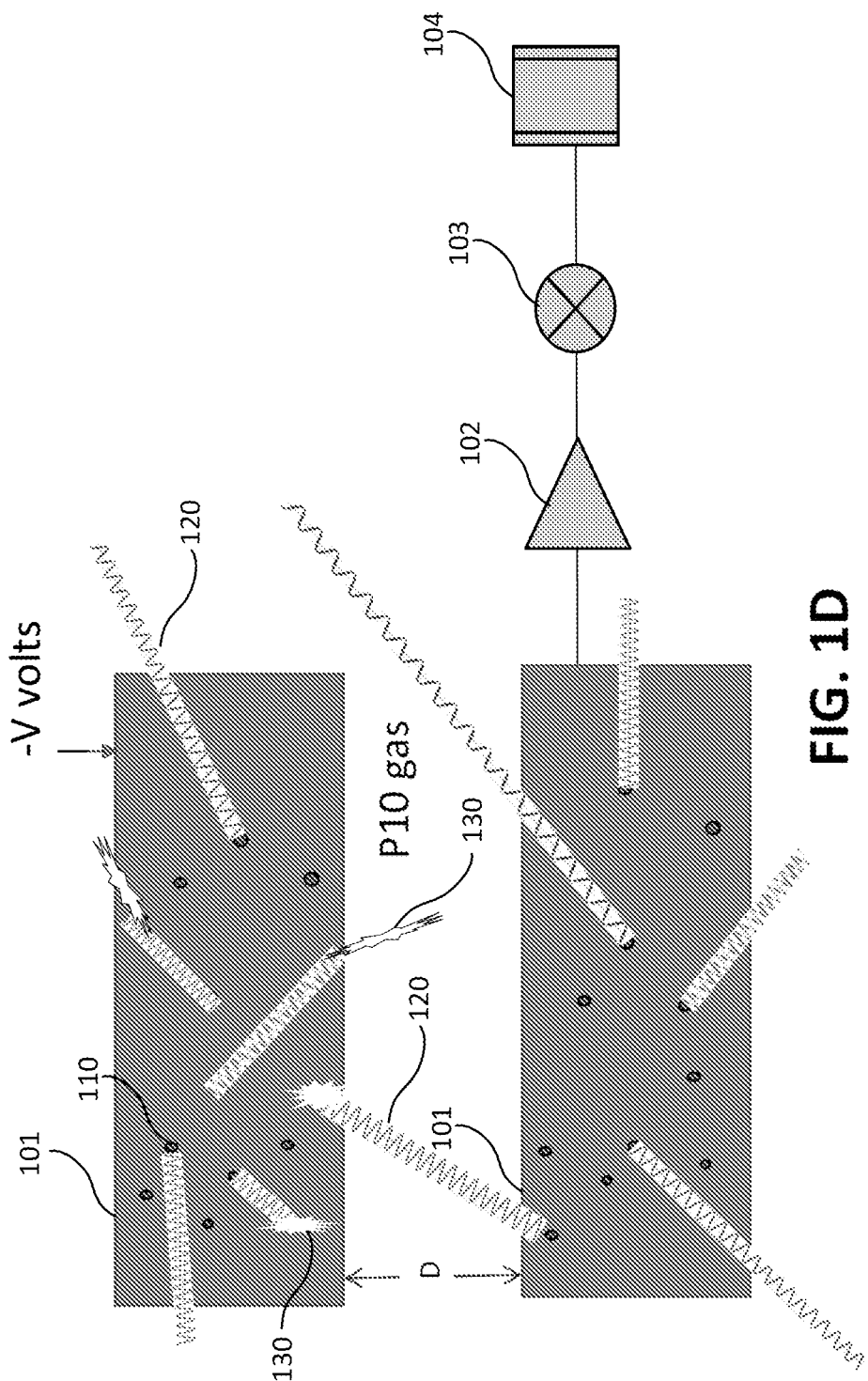
FIG. 1D shows the NAD of FIG. 1C, in which some of the emitted gammas produce electron showers.
Figure 1E:
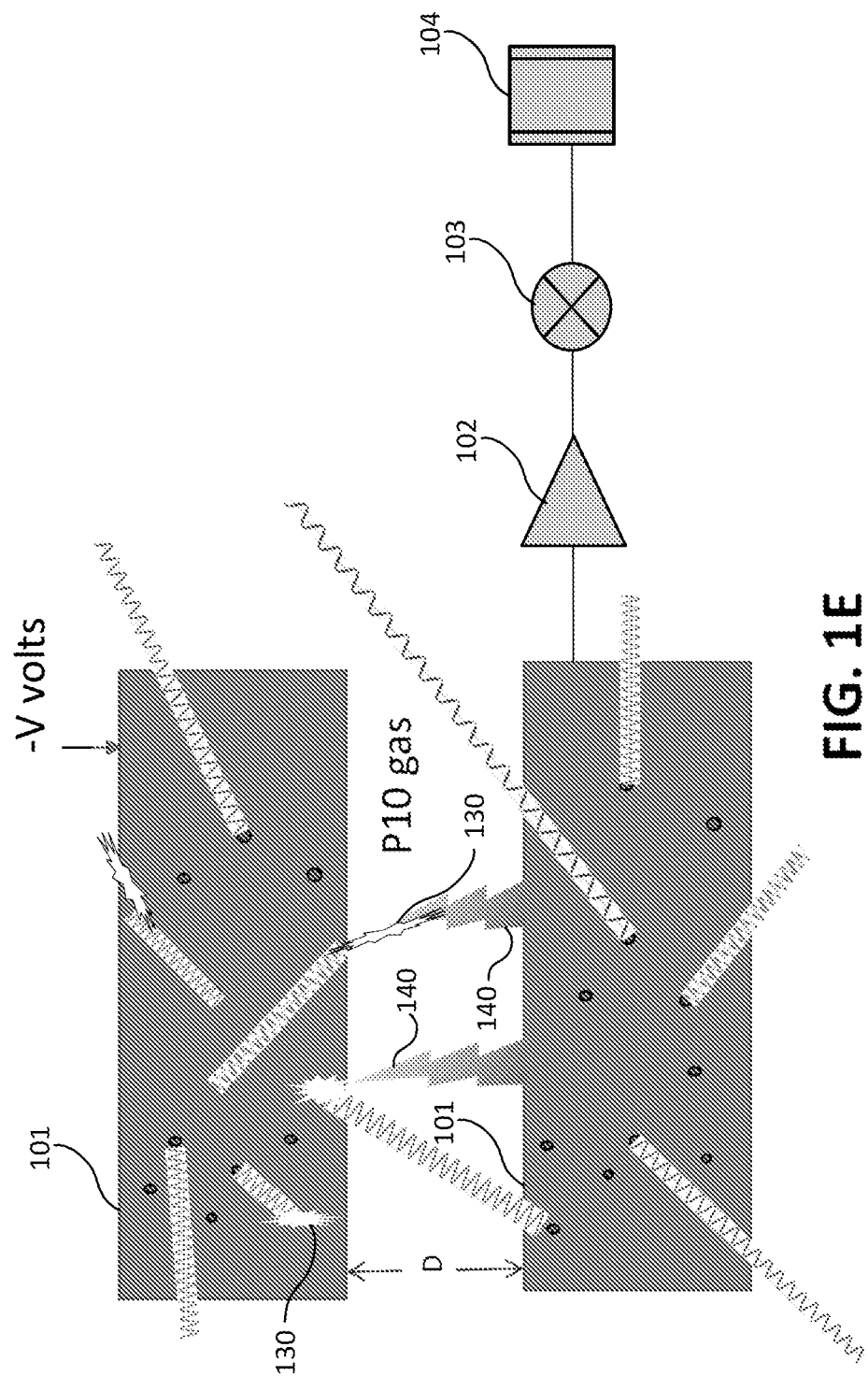
FIG. 1E shows the NAD of FIG. 1D, in which some of the electrons enter the gas-filled gap between wafers to cause electron avalanche.
Figure 1F:
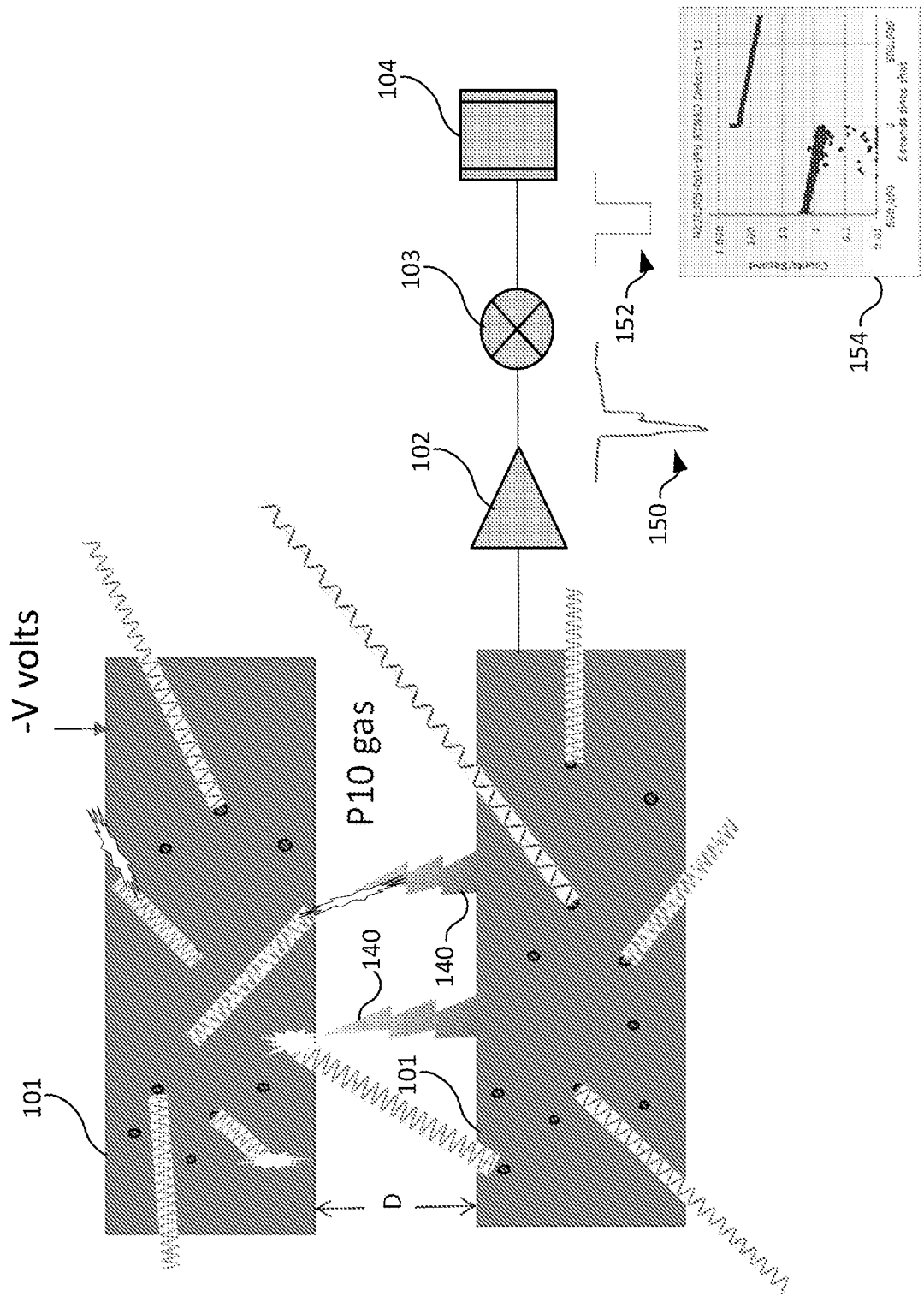
FIG. 1F shows the NAD of FIG. 1E, in which the electron avalanche induces a current between the anode and cathode, to cause a pulse detectable by the electronics.
Figure 2A:
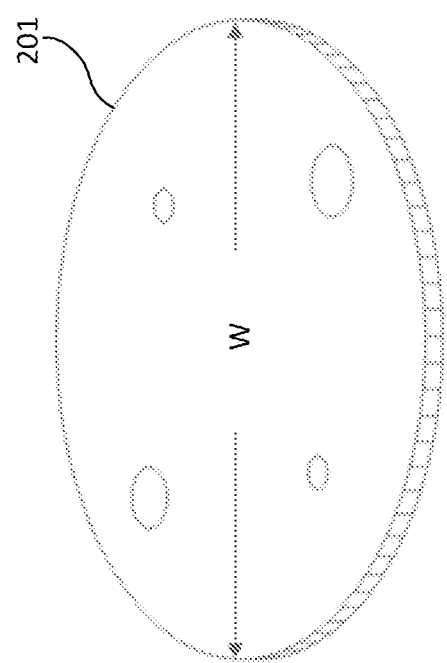
FIG. 2A shows an insulative disc upon which other components of the NAD can be mounted.
Figure 2B:
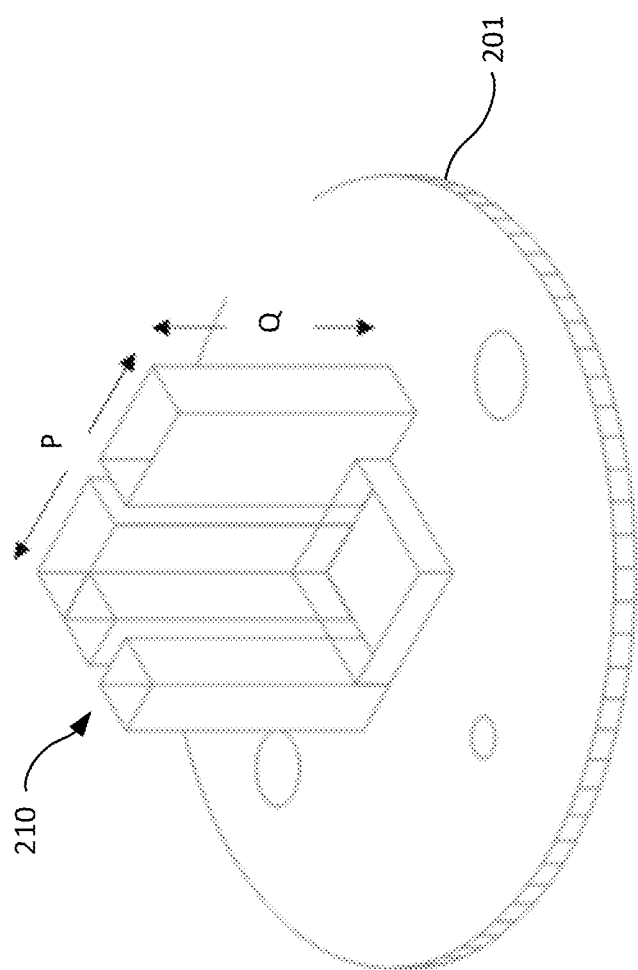
FIG. 2B shows the insulative disc with insulative blocks mounted thereon.
Figure 2D:
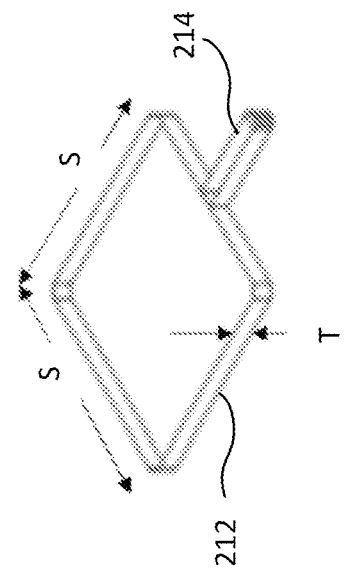
FIG. 2D is an enlarged view of the wafer that forms the ground plane of the NAD.
Figure 2C:
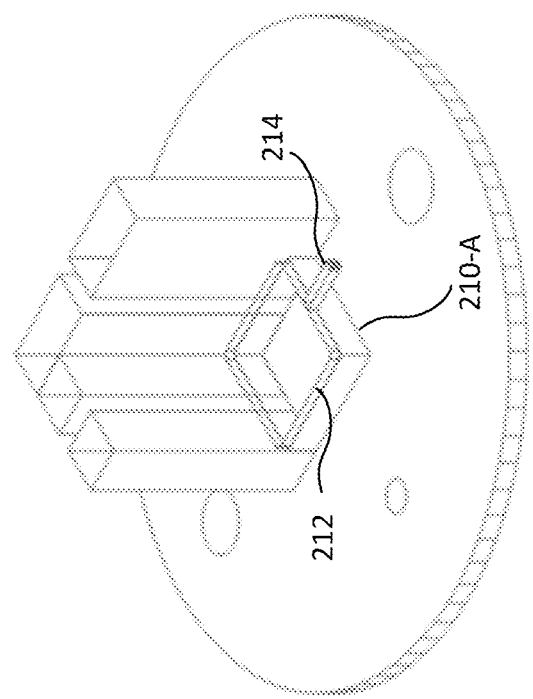
FIG. 2C shows a wafer forming a ground plane of the NAD, mounted on an insulative block on the insulative disc.
Figure 2F:
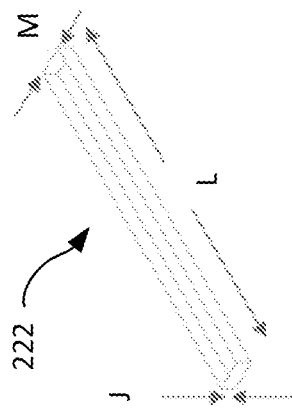
FIG. 2F is an enlarged view of one of the spacers.
Figure 2G:
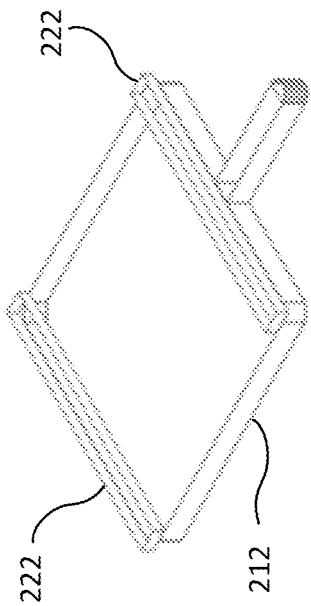
FIG. 2G is an enlarged view of the ground plane wafer with the spacers mounted thereon.
Figure 2E:
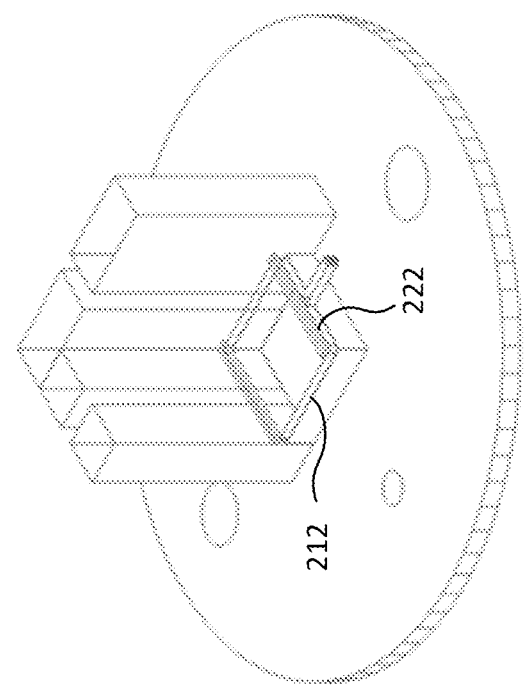
FIG. 2E shows the ground plane wafer with insulative spacers mounted thereon, mounted on an insulative block on the insulative disc.
Figure 2I:
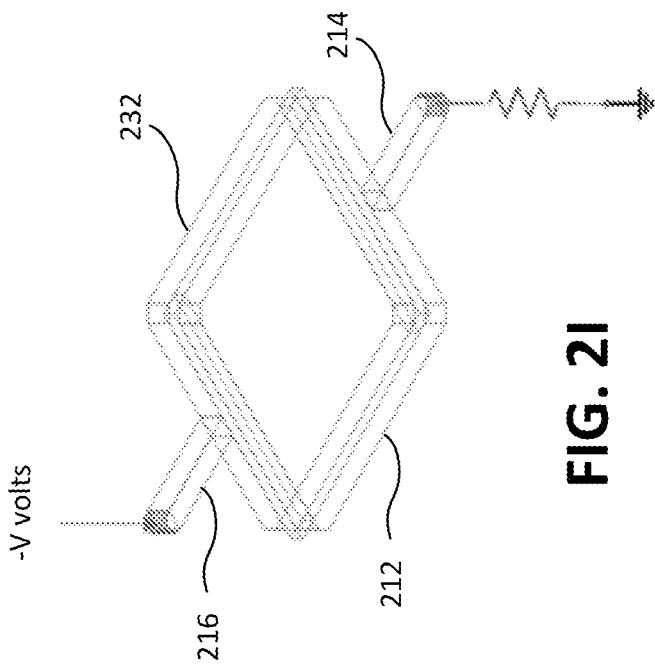
FIG. 2I is an enlarged perspective view of the two stacked wafers and spacers connected to respective voltage terminals.
Figure 2J:
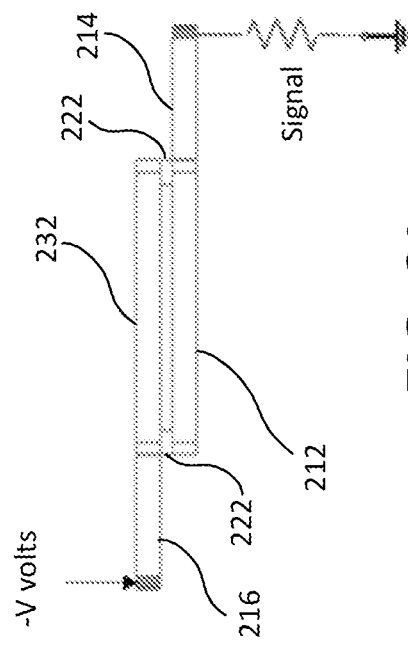
FIG. 2J is an enlarged side schematic view of the two stacked wafers and spacers connected to respective voltage terminals.
Figure 2H:
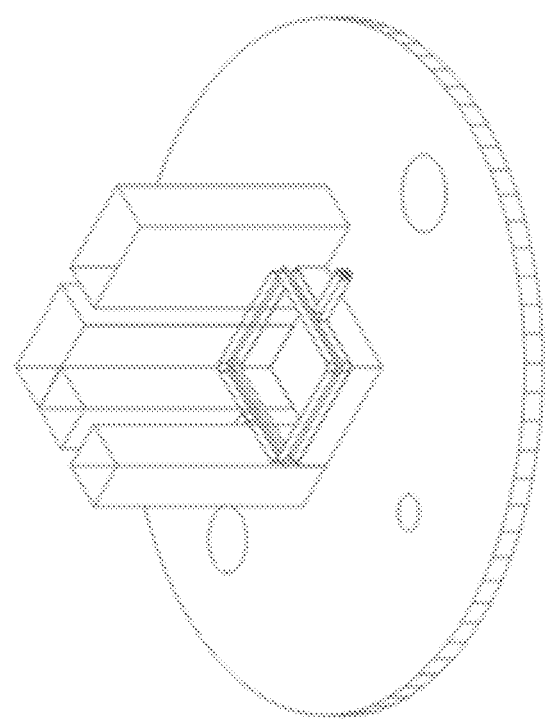
FIG. 2H shows a second wafer that forms the high voltage plane stacked over the ground plane wafer and spacers.
Figure 2L:
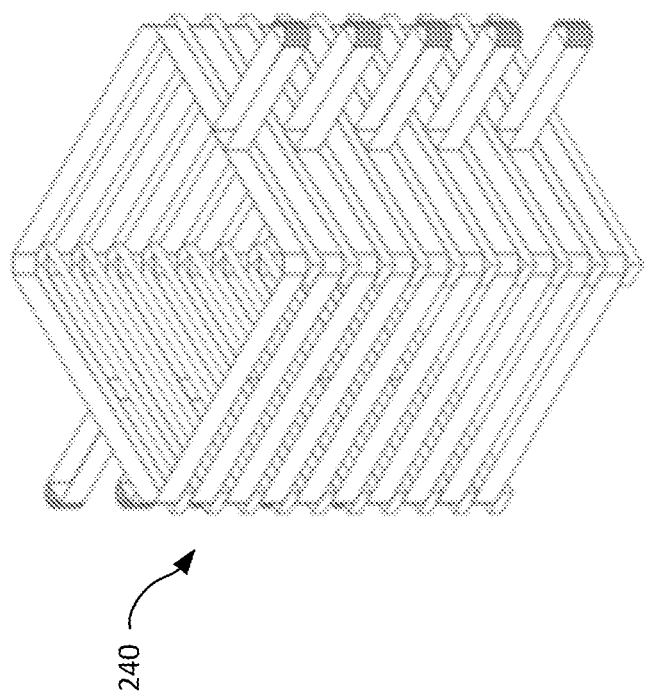
FIG. 2L is an enlarged perspective view of the stack of wafers in FIG. 2K.
Figure 2K:
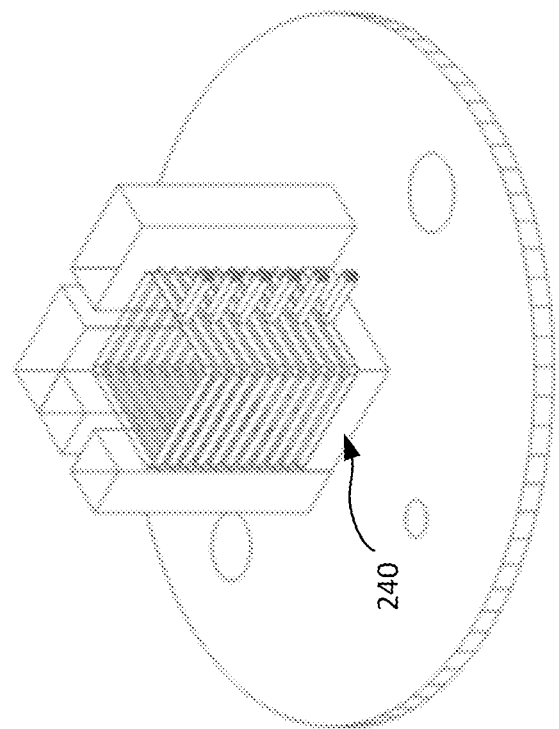
FIG. 2K shows a larger stack of wafers on the insulative block on the insulative wafer.
Figure 2M:
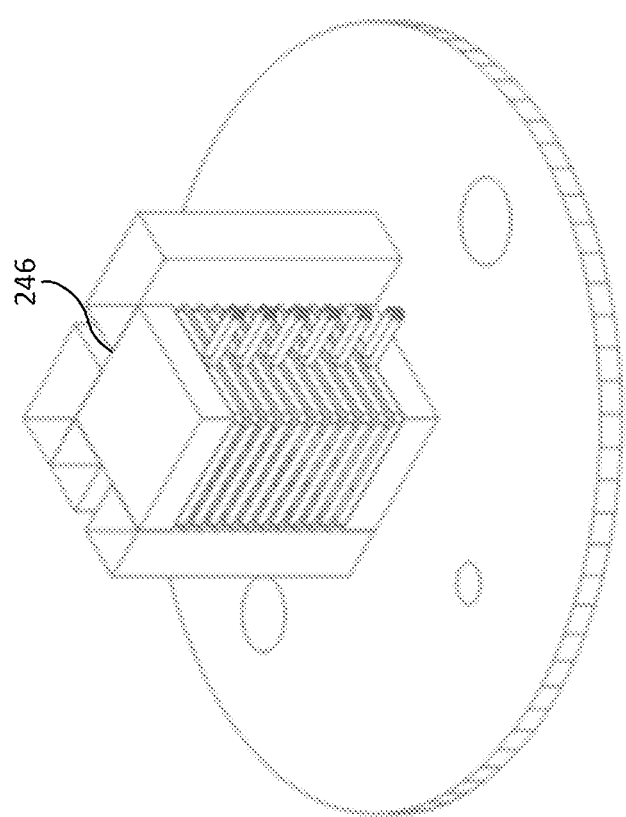
FIG. 2M shows the stack of wafers with an insulative cap mounted thereon.
Figure 2N:
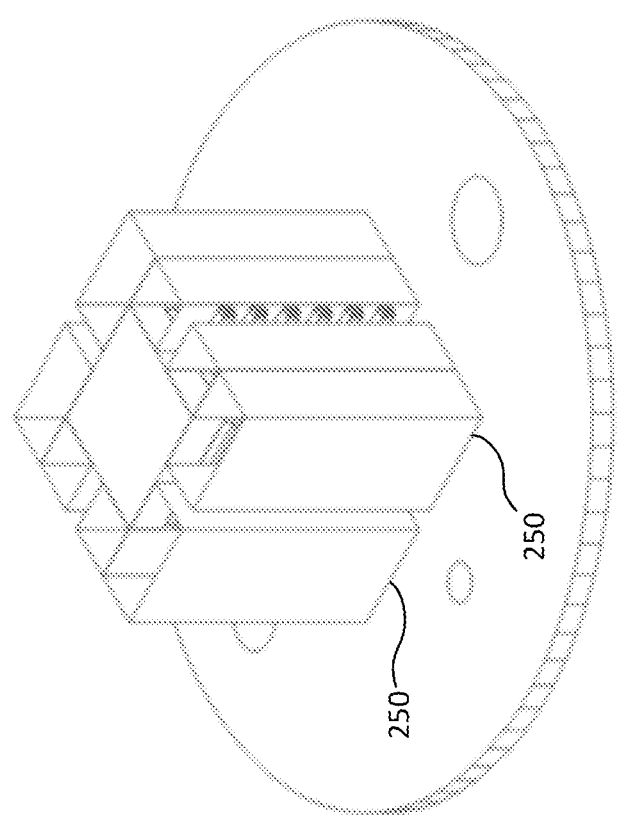
FIG. 2N shows the stack of wafers with an insulative cap mounted thereon and with additional insulative blocks surrounding the stack.
Figure 2P:
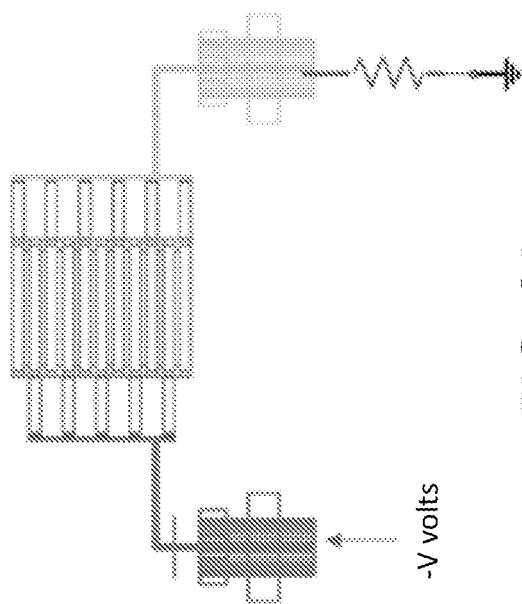
FIG. 2P shows a schematic view of how the electrical leads of the wafer stack are connected.
Figure 2O:
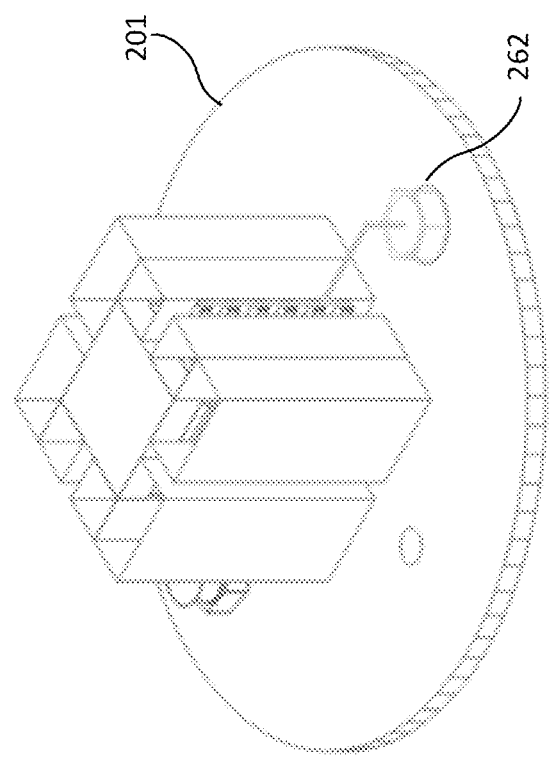
FIG. 2O shows a perspective view of how the electrical leads of the wafer stack are connected.
Figure 2Q:
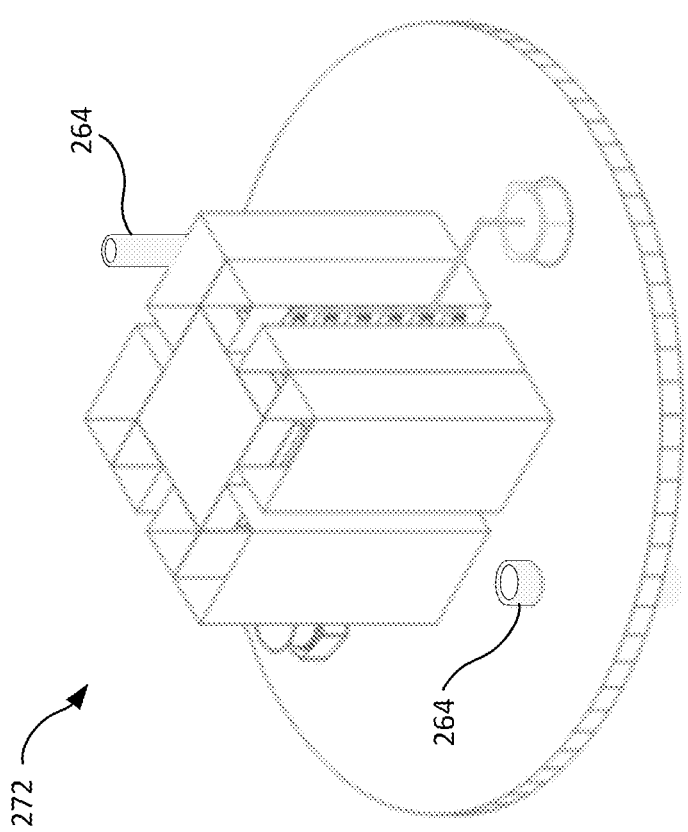
FIG. 2Q shows the complete activation structure, including two gas conduits for gas injection and removal.
Figure 2R:
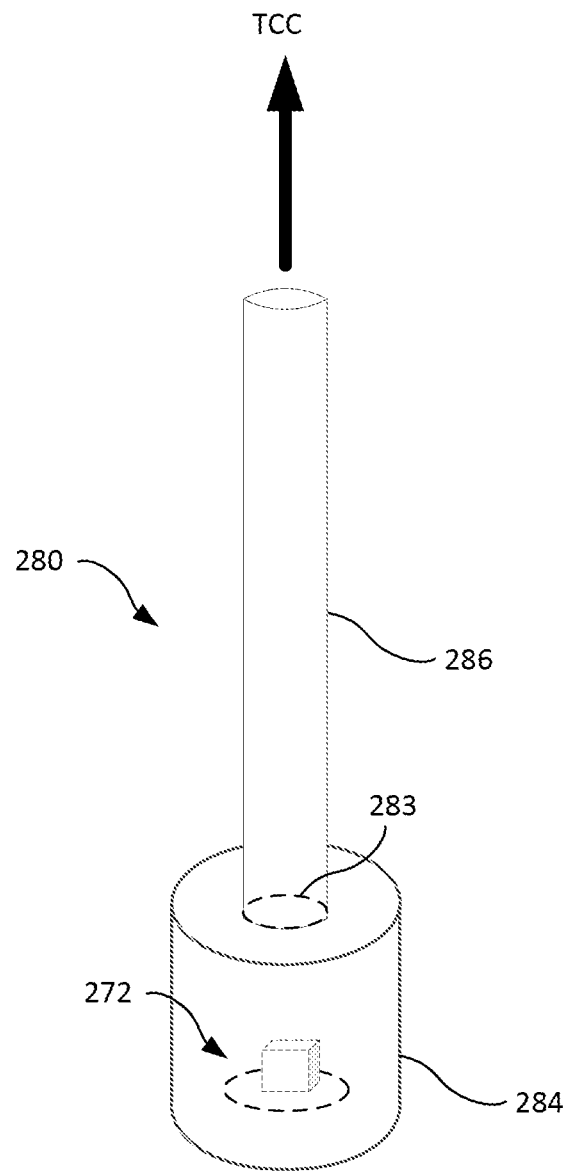
FIG. 2R shows the complete NAD, with the activation structure mounted inside a housing.

The following description first explains the principle of operation of the NAD introduced here in relation to FIGS. 1A through 1F, and then describe an example embodiment of the NAD in relation to FIGS. 2A through 2R.

Principle of Operation

The principle of operation of the NAD introduced here is as follows. Referring to FIG. 1A, in one embodiment, one or more pairs of wafers 101 form an activation medium. Each wafer 101 consists substantially of $^{90}$Zr. What is meant by "consists substantially" here is that the concentration of any other elements is sufficiently negligible so as not to affect the tendency of the material to produce a threshold reaction when impacted by fast neutrons. Adjacent wafers 101 are spatially offset from each other by a distance, D. In at least one embodiment, the distance D is 500 micrometers. A negative voltage, V, is applied to one of the wafers in each pair, which forms the cathode of an anode-cathode pair. In at least one embodiment, the value of V is 500 volts. The other wafer 101 in each pair, i.e., the anode, is electrically coupled to an amplifier 102. The output of the amplifier 102 is coupled to the input of a pulse discriminator 103, and the output of the pulse discriminator 103 is coupled to the input of a pulse counter 104. The output of the pulse counter may be connected to a conventional output device (not shown), such as a display screen. The gap between the wafers is filled with a gas, such as P10 (i.e., 10% methane and 90% Ar) at 1 atm of pressure.

During operation, fast (e.g., 14 MeV) neutrons interact with the $^{90}$Zr to produce the threshold reaction, $^{90}$Zr (n,2n) $^{89}$Zr, i.e., producing $^{89}$Zr atoms 110 (FIG. 1B). The $^{89}$Zr decays followed by the emission of 909 keV gammas 120 (FIG. 1C). Some of the gammas 120 interact in the Zr wafers 101, creating electron showers 130 (FIG. 1D), but most escape. Some of the electrons enter the gap between the Zr wafers and avalanche (140) in the gas (FIG. 1E), thereby inducing a current pulse between the two wafers 101.

The current pulse 150 is amplified by the amplifier 102 and, if it is of sufficient magnitude, is converted into a voltage pulse 152 by the pulse discriminator 103 (FIG. 1F). The voltage pulse 152 is then counted by the pulse counter 104. This process may be repeated many times per second. A value and/or visualization 154 (e.g., a graph) representing the total pulse count or counts per unit time may then be output to a user via a display device.

In the case of an ICF shot, the pulse rate as a function of time can be recorded and fit to a sum of exponentials with the half-lives of the expected activation products to determine the activity at shot time, which is proportional to the yield. To monitor neutron emission during a tokomak burn, the count rate can be recorded and then deconvolved with the lifetime to produce the yield as a function of time. Neutron generators and tokomaks can be monitored using either the integration of the pulses to provide the total number of delivered 14 MeV neutrons or, using short-lived activation products, recording the time-dependent count rate or, at high enough rates, where the pulses merge into a continuous current, recording the time-dependent current to monitor the temporal delivery of neutrons.

In other embodiments, rather than $^{90}$Zr, the wafers 101 can be made of any other material that produces a threshold reaction, e.g., an (n,2n) or (n,α) reaction, in response to fast neutrons. Examples of other materials that may be usable for this purpose include $^{9}$Be, $^{61}$Ni, $^{141}$Pr, $^{84}$Sr, and $^{45}$Sc. Some materials, such as $^{9}$Be and $^{141}$Pr, upon activation directly emit electrons or alpha particles, which will avalanche upon entering the gap. $^9$Be decays instantly upon activation and would be used to monitor fluctuations in prolonged tokomak DT burns. In this case, instead of counting pulses, the electronics would measure the time history of the continuous current produced by the detector. For some materials, sturdy wafers can be made by sputtering or evaporating them onto carbon wafers. Additionally, other spacings, wafer thickness, geometries, including cylindrical cathodes with wire anodes, gases, and materials can be used to optimize timing response and materials for different applications. In addition, for some applications it may be desirable to operate the gaseous ionization detector in Geiger mode where the voltage is sufficiently high that the discharge involves the whole gap producing a very large electrical pulse that can be counted without amplification but must be quenched using external circuitry.

Example Embodiment

An illustrative embodiment of the NAD introduced here will now be discussed with reference to FIGS. 2A through 2R. Note that other embodiments are possible, consistent with the principles introduced here. The starting point of the illustrated embodiment is a non-activating, electrically insulative disc 201, as shown in FIG. 2A. The material of the insulative disc 201 can be, for example, CH. The diameter, W, of the disc 201 can be, for example, 60 mm. Next a set of insulative blocks 210 are added on top of the disc, as shown in FIG. 2B. The insulative blocks 210 can be made of Lucite, for example, and an appropriate glue that fastens plastics can be used to hold the disc 201 and blocks 210 together. In at least one embodiment, dimension P is 22 mm and dimension Q is 22.3 mm. Next, a $^{90}$Zr wafer 212 is placed on top of the bottom block 210-A, to form a ground plane (i.e., the cathode of the NAD), as shown in FIG. 2C. A conductive lead 214 is connected to the wafer 212. FIG. 2D shows a close-up view of the $^{90}$Zr wafer 212, for an embodiment in which the wafer 212 has a square footprint, having sides of length S and thickness T. In one embodiment, dimension S is 12 mm and dimension T is 1 mm (sputtered wafers would likely be significantly thinner), in which case the wafer 212, consisting substantially of $^{90}$Zr, would have a weight of approximately 1 gm. The same composition and dimensions can be used for the other wafers in the NAD, as described below.

Next, two or more electrically insulative spacers 222 are added to the top surface of the initial wafer 212, as shown in FIG. 2E. The spacers 222 may be affixed to the wafer 212 using the same glue mentioned above, that is used to attach the insulative blocks 210 to the wafer 212. Each spacer 222 can be about the same length as the side length, S, of the wafer 212, but is much narrower, as shown in FIG. 2F. Each spacer 222 has length, L, width, M, and thickness, J. Assuming the wafer is 12 mm on each side, the length, L, of each spacer 222 may be 12 mm, the width, M, may be 1 mm, and the thickness, J, may be 0.5 mm, for example. Preferably, a spacer 222 is placed along each of two opposite edges of the top surface of the wafer 212, as shown in FIG. 2G.

Next, a second $^{90}$Zr wafer 232 is stacked above the first wafer 212 (or more precisely, on top of the spacers 222 that are on top of the first wafer 212), as a high-voltage plane, as shown in FIG. 2H, and as shown in further detail in FIGS. 2H and 2J. A second electrical lead 216 is connected to the second wafer 232. In one embodiment, the value of voltage, V, is 500 V. One or more additional $^{90}$Zr wafers and associated electrical leads can then be stacked above the first two wafers 212 and 232 in a similar manner (i.e., using additional spacers 222) to form a taller stack of wafers 240, as illustrated in FIGS. 2K and 2L. Adjacent wafers alternate between those that are to form the ground plane (the anode) and those that are to form the high-voltage plane (the cathode). In one embodiment, the stack of wafers includes 11 $^{90}$Zr wafers, with 10 inter-wafer gaps, formed in this manner.

Next, an insulating cap 246, which can be made of CH or Lucite for example, is added on top of the top wafer stack, as shown in FIG. 2M. Additional insulating blocks 250 are then placed around the remaining open sides of the wafer stack 240, as shown in FIG. 2N. Next, the high voltage and ground are connected to the leads on the cathode and anode wafers, respectively, through vias 262 in the bottom insulative disk 201, as shown in FIGS. 2O and 2P. Next, as shown in FIG. 2Q, two gas conduits (e.g., hollow tubes) 264 are fitted through two holes 266, respectively, on opposite sides of the insulative disk 201, for injection and removal of the P10 gas during operation of the NAD. The result of this step is the finished activation structure 272.

Finally, the activation structure 272 is enclosed in a housing 280 to form the finished NAD 280. The housing can be made of a material, such as tantalum (Ta), that will absorb 1368 and 2754 keV Al gammas and 844 keV Mn gammas, which are background sources commonly found in research facilities. In the illustrated embodiment, the housing is made of two hollow cylindrical portions, including a first housing portion 284 and a second housing portion 286. The first housing portion 284 houses the activation structure 272 and has an opening 283 at the top. The narrower, longer second housing portion 286 fits over the opening 283 in the top of the first housing portion 284 and allows the detector to be narrowly aimed at the target chamber center (TCC), where the reaction that produces the fast neutrons occurs.

FIG. 3 shows an example of a process corresponding to the operation of a NAD such as introduced here, e.g., NAD 280. Though the steps are presented in a particular order, it will be understood that in an actual implementation, at least some of these steps may occur concurrently and/or in a different order than that described here. At step 301 the process produces, by a material within a fast neutron detector, gammas, electrons, or alpha particles in response to impacts on the material by fast neutrons. At step 302 the process causes an electron avalanche within the fast neutron detector in response to the gammas, electrons, or alpha particles, wherein the electron avalanche induces fluctuations in a current between a plurality of electrodes. At step 303 the process detects individual fluctuations in the current, due to the electron avalanche. At step 304 the process determines a count of the detected fluctuations in the current. At step 305 the process produces an output indicative of the count.

Unless contrary to physical possibility, it is envisioned that (i) the methods/steps described herein may be performed in any sequence and/or in any combination, and that (ii) the components of respective embodiments may be combined in any manner.

The machine-implemented computational and control operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A neutron activation detector (NAD) comprising:
   a first enclosure;
   a plurality of electrical leads; and
   an activation medium disposed within the enclosure and consisting essentially of a material that is activated by fast neutrons, the activation medium being arranged within the enclosure so that activation of the material by fast neutrons results in a current between the plurality of electrical leads.

2. A NAD as recited in claim 1, wherein:
   the activation medium comprises a plurality of electrodes, each consisting essentially of the material, the plurality of electrodes including one or more anodes each coupled to a first electrical lead of the plurality of electrical leads and one or more cathodes each coupled to a second electrical lead of the plurality of electrical leads;
   the plurality of electrodes are spaced apart from each other within the first enclosure so as to enable a gas to exist between the plurality of electrodes; and
   activation of the material by fast neutrons produces an isotope of the material, decay of the isotope produces secondary radiation, which causes an electronic discharge within the gas, and the electronic discharge within the gas induces a current pulse between the one or more anodes and the one or more cathodes.

3. A NAD as recited in claim 2, further comprising:
   a first gas port through which to inject a gas into the first enclosure; and
   a second gas port through which to remove the gas from the first enclosure.

4. A NAD as recited in claim 2, further comprising:
   an amplifier having a first input coupled to the first electrical lead and a second input coupled to the second electrical lead, to amplify current pulses between the one or more anodes and the one or more cathodes;
   a discriminator coupled to receive an output of the amplifier, to detect pulses based on the output of the amplifier and to produce an output indicative of detection of each of the pulses;
   a counter coupled to an output of the discriminator, to count the pulses; and
   an output device to produce an output indicative of a rate of the pulses, based on an output of the counter.

5. A NAD as recited in claim 2, wherein each of the plurality of electrodes has a wafer form factor, and the plurality of electrodes are arranged in a stacked arrangement.

6. A NAD as recited in claim 5, further comprising:
   a plurality of insulative spacers between each of one or more electrode pairs of the plurality of electrodes, each electrode pair consisting of one anode and one cathode of the plurality of electrodes.

7. A NAD as recited in claim 2, wherein the material consists essentially of zirconium (Zr).

8. A NAD as recited in claim 7, wherein the gas consists substantially essentially of P10 gas.

9. A NAD as recited in claim 2, wherein the material consists essentially of beryllium (Be).

10. A NAD as recited in claim 9, wherein the gas consists substantially essentially of P10 gas.

11. A NAD as recited in claim 1, wherein the material is a material that has a (n,2n) reaction or a (n,α) reaction in response to fast neutrons.

12. A NAD as recited in claim 1, wherein the material is a material that has a (n,2n) reaction or a (n,α) reaction in response to 14 MeV neutrons.

13. A NAD as recited in claim 1, further comprising a second enclosure, in which the enclosure is located, to block background gamma radiation from entering the first enclosure.

14. A NAD as recited in claim 13, wherein the first enclosure consists essentially of acrylic glass.

15. A NAD as recited in claim 14, wherein the second enclosure consists essentially of tantalum (Ta).

16. A neutron activation detector (NAD) comprising:
   an enclosure that is hermetically sealed;
   a plurality of gas ports, including a first gas port through which to inject a gas into the enclosure and a second gas port through which to remove the gas from the enclosure;
   a plurality of electrical leads, including a first electrical lead and a second electrical lead;
   a plurality of substantially flat electrodes in a stacked arrangement and spaced apart by a plurality of insulative spacers, the plurality of electrodes including one or more anodes each coupled to the first electrical lead and one or more cathodes each coupled to the second electrical lead, the plurality of electrodes spaced apart from each other within the enclosure so as to enable the gas to exist between the plurality of electrodes, each of the plurality of electrodes consisting essentially of a material, an isotope of which is created when struck by fast neutrons including those having an energy of approximately 14 MeV wherein during operation, decay of the isotope in response to activation by neutrons having an energy of approximately 14 MeV produces secondary radiation, and wherein the secondary radiation causes electronic discharge within the gas, and the electronic discharge within the gas cause fluctuations in current between the one or more anodes and the one or more cathodes;

an amplifier having a first input coupled to the first electrical lead and a second input coupled to the second electrical lead, to amplify current pulses between the one or more anodes and the one or more cathodes;

a discriminator coupled to receive an output of the amplifier, to detect pulses based on the output of the amplifier and to produce an output indicative of detection of each of the pulses;

a counter coupled to an output of the discriminator, to count the pulses; and an output device to produce an output indicative of a rate of the pulses, based on an output of the counter.

17. A NAD as recited in claim 16, wherein the material is a material that has a (n,2n) reaction or a (n,α) reaction in response to fast neutrons.

18. A NAD as recited in claim 17, wherein the material is a material that has a (n,2n) reaction or a (n,α) reaction in response to 14 MeV neutrons.

19. A NAD as recited in claim 16, wherein the material consists essentially of zirconium (Zr).

20. A NAD as recited in claim 19, wherein the gas consists essentially of P10 gas.

21. A NAD as recited in claim 16, wherein the material consists essentially of beryllium (Be).

22. A NAD as recited in claim 21, wherein the gas consists essentially of P10 gas.

23. A NAD as recited in claim 16, wherein the second enclosure consists essentially of tantalum (Ta).

24. A method comprising:

producing, by a material within a fast neutron detector, secondary radiation in response to impacts on the material by fast neutrons;

causing electronic discharge within the fast neutron detector in response to the secondary radiation, wherein the electronic discharge induces fluctuations in current between a plurality of electrodes;

detecting individual fluctuations in the current;

determining a count of the detected fluctuations in the current; and producing an output indicative of the count.

25. A method as recited in claim 24, wherein the material has a (n,2n) reaction or a (n,α) reaction in response to the fast neutrons.

26. A method as recited in claim 24, wherein the material has a (n,2n) reaction or a (n,α) reaction in response to 14 MeV neutrons.

27. A method as recited in claim 24, further comprising providing a P10 gas between the plurality of electrodes, wherein the electronic discharge occurs at least partially within the P10 gas.

* * * * *